United States Patent [19]
Buddendeck et al.

[11] Patent Number: 6,045,306
[45] Date of Patent: Apr. 4, 2000

[54] REMOTE ACTUATED CHUCK DEVICE FOR FIXED BASE ROUTERS

[75] Inventors: Keith Buddendeck, Clemson; Ronald W. Miksa, Central; Jeremy Grayson, Columbia, all of S.C.

[73] Assignee: Power Tool Holders Incorporated, Wilmington, Del.

[21] Appl. No.: 09/196,510

[22] Filed: Nov. 20, 1998

[51] Int. Cl.[7] ............................... B23C 1/20; B23B 31/02
[52] U.S. Cl. ........................... 409/182; 279/50; 279/134; 279/218
[58] Field of Search ................................... 409/175, 181, 409/182, 204, 206, 218; 279/43, 50, 58, 74, 75, 134, 135

[56] References Cited

U.S. PATENT DOCUMENTS

| | | | |
|---|---|---|---|
| 1,285,763 | 11/1918 | Markey | 279/146 |
| 2,353,966 | 7/1944 | Newcombe . | |
| 2,354,966 | 8/1944 | Panza et al. | 279/50 |
| 2,370,729 | 9/1945 | Hoppe . | |
| 2,410,344 | 10/1946 | Hines | 279/50 |
| 2,466,651 | 4/1949 | Goldsby . | |
| 2,562,143 | 7/1951 | Godfrey et al. | 409/182 |
| 3,095,205 | 6/1963 | Farnsworth . | |
| 3,363,510 | 1/1968 | Burrows et al. | 409/182 |
| 3,811,361 | 5/1974 | Seely et al. . | |
| 4,656,727 | 4/1987 | Itoh | 279/43 |
| 5,921,730 | 7/1999 | Young et al. | 409/182 |

OTHER PUBLICATIONS

U.S. Patent Application entitled "Rotary Power Tool With Remotely Actuated Chuck", USSN 09/196,580, Filed Nov. 20, 1998.

U.S. Patent Application entitled "Electronic Lever for Remotely Actuating A Chuck Device," USSN 09/196,795, Filed Nov. 20, 1998.

U.S. Patent Application entitled "Rotary Power Tool With Hydraulically Actuated Chuck," USSN 09/197,261, Filed Nov. 20, 1998.

U.S. Patent Application entitled "Horizontal Lever Actuated Chuck," USSN 09/197,260, Filed Nov. 20, 1998.

U.S. Patent Application entitled "Rotary Power Tool with Remotely Actuated Chuck," USSN 09/067,629, Filed Apr. 28, 1998.

*Primary Examiner*—Andrea L. Pitts
*Assistant Examiner*—Erica Ergenbright
*Attorney, Agent, or Firm*—Dority & Manning

[57] ABSTRACT

A rotary power tool is provided having a remotely actuated chuck device. The chuck is mounted onto the end of a drive spindle that extends from the casing of the power tool. The chuck includes an outer sleeve member that is axially movable relative to a drive spindle between a gripping and release position. A sleeve actuating device is provided having a first member engaged with the outer sleeve member and which extends generally radially outward from the drive spindle or chuck. The first member is movable in a direction so as to move the outer sleeve member between the gripping position and release position. The sleeve actuating device includes an actuator member configured with the first member to move the first member upon an external force being applied thereto. A base is rotatably advanceable and concentric on the casing. A helical opening is formed in the base. The chuck actuating device fits into the helical groove so that the base is fully rotatably adjustable without interference from the actuating device.

13 Claims, 3 Drawing Sheets

REMOTE ACTUATED CHUCK DEVICE FOR FIXED BASE ROUTERS

BACKGROUND OF THE INVENTION

The present invention relates to a rotary power tool, particularly a router, having a chuck device for holding a tool bit to a drive spindle wherein the chuck device is remotely actuated.

There are a number of well known types of power tools, including routers, wherein a chuck is mounted on the end of a rotatable drive spindle for holding a tool bit to the drive spindle. In many applications of these tools, it is necessary to manually manipulate or engage the chuck in order to change out the tool bit. A number of chuck devices utilize an axially movable outer sleeve member to actuate the chuck. For example, many such chuck devices have an axially movable outer sleeve that moves between a gripping position wherein the chuck grips upon a tool shank inserted into the chuck, and a release position wherein the chuck releases the tool shank inserted therein. Such chuck devices are commonly referred to as "quick-change" chucks. For example, one such chuck is illustrated and described in U.S. Pat. No. 5,810,366. Additional examples of such chucks are illustrated in U.S. Pat. Nos. 4,692,073; 2,807,473 and 3,521,895. U.S. Pat. No. 5,947,484 describes another type of sleeve actuated chuck.

In certain operating environments, particularly with high speed routers, there is limited space in the critical area of the chuck device and tool bit to actuate the chuck for removal or insertion of the tool bit and the operation of changing out the tool bits can be potentially dangerous. With many conventional tools, the chucks are actuated by an external mechanism, such as a wrench or other tool. There is, however, a trend in the industry to incorporate quick-change chucks with such tools, particularly routers, to eliminate the necessity of external tools for operating the chucks and to take advantage of the obvious benefits of the quick-change chucks. However, the operation of actuating these quick-change chucks may also be cumbersome and potentially dangerous, especially where the operator must insert his hands next to the cutting edges of the tool bit.

The present invention provides an apparatus for remotely actuating a quick-change chuck device on rotary power tools, particularly routers, in a safe and quick manner.

OBJECTS AND SUMMARY OF THE INVENTION

It is, therefore, a principle object of the present invention to provide a power rotary tool incorporating a mechanism for remotely actuating the chuck device.

An additional object of the present invention is to provide a mechanism for safely changing out tool bits in rotary power tools wherein the operator's hands are totally removed from the cutting area of the tool bits.

Still a further object of the present invention is to provide a mechanism for remotely actuating chucks on rotary power tools, specifically fixed base routers, so that actuation of the chuck is no longer limited by manual hand strength.

Additional objects and advantages of the invention will be set forth in part in the following description, or may be obvious from the description, or may be learned through practice of the invention.

In accordance with the object and purposes of the invention, a rotary power tool is provided having a remotely actuated chuck device mounted on the end of a rotatable drive spindle. The power tool includes a casing housing the drive spindle with an end of the spindle extending through the casing and coupled with the chuck device. A chuck actuating device is engaged with the chuck device. The actuating device has a portion extending radially beyond the perimeter of the casing.

Additionally, there exists a base concentric on the casing. The base is comprised of an upper working surface for establishing a working position of a tool held by the chuck device. The base is rotatably advanceable on the casing for adjusting the working position of the tool. The base includes a helical opening around its perimeter. This opening accommodates the portion of the actuating device extending radially beyond the perimeter of the casing as the base is rotatably advanced relative to the casing.

The chuck device is movable between a gripping position when the chuck clamps upon a tool bit held within the chuck device and a release position when the chuck device releases a tool bit. The present invention is not limited to any particular type of chuck device and, in this regard, the internal working mechanisms of the chuck device are not particularly important to the invention or necessary for an understanding of the invention. Similarly, the remote actuating device is not limited to any particular type. It is intended that the present invention be utilized with any chuck device which utilizes an actuating device that extends radially beyond the perimeter of the casing.

The rotary power tool, according to the invention, contains a chuck device comprising an outer sleeve member which is axially movable between a gripping position and a release position where the chuck device releases a tool held therein.

The rotary power tool, according to the invention, also includes a sleeve actuating device having a first member that is engaged to the outer sleeve member of the chuck and which extends generally radially outward from the chuck. The first member is movable or pivotable in a direction so as to move the outer sleeve member of the chuck between the gripping position and the release position. The sleeve actuating device includes an actuator member configured or coupled with the first member to move the first member upon an external force being applied to the actuator member. The external force may be a manual force, pneumatic force, electric force, hydraulic force, etc. In this manner, upon the external force being applied to the actuator member, the first member causes the chuck to move between the gripping and release positions. Thus, the operator can remotely actuate the chuck while being completely removed from the working area of the tool bit held by the chuck.

In a preferred embodiment of the invention, the actuator member includes a lever arm that is connected to the first member and extends generally longitudinally along an outside surface of the tool casing. In one embodiment, the lever arm is generally perpendicular to the first member and is pivotal or movable in a plane of movement alongside the casing. The actuator member, in the form of the lever arm, is extended outside the perimeter of the rotatably advanceable base. The helical opening in the base accommodates the actuating member so that the base may be advanced or retracted without interfering with the operation of the actuator member. In an alternative embodiment, the lever arm is pivotal in a radial direction relative to the drive spindle. In other words, the lever arm pivots towards and away from the casing. This pivotal movement of the lever arm also causes the first member to move or pivot away from and towards the chuck sleeve member. The first member is operably physically engaged with the sleeve member and thus imparts axial movement to the sleeve member as it is moved by the lever arm. In this embodiment, it may be preferred that the first member and lever arm perform as a single integral component.

The remote actuating mechanism may be incorporated as a component of the power tool casing, or may be an after market retrofit item that can be easily installed on existing rotary power tools. In this embodiment, the mechanism should include a base member that is easily attachable to any manner of conventional rotary power tool.

Preferred embodiments of the present invention will now be discussed in detail with reference to the following figures.

DETAILED DESCRIPTION OF THE PREFERRED EMBODIMENTS

Figure 1:
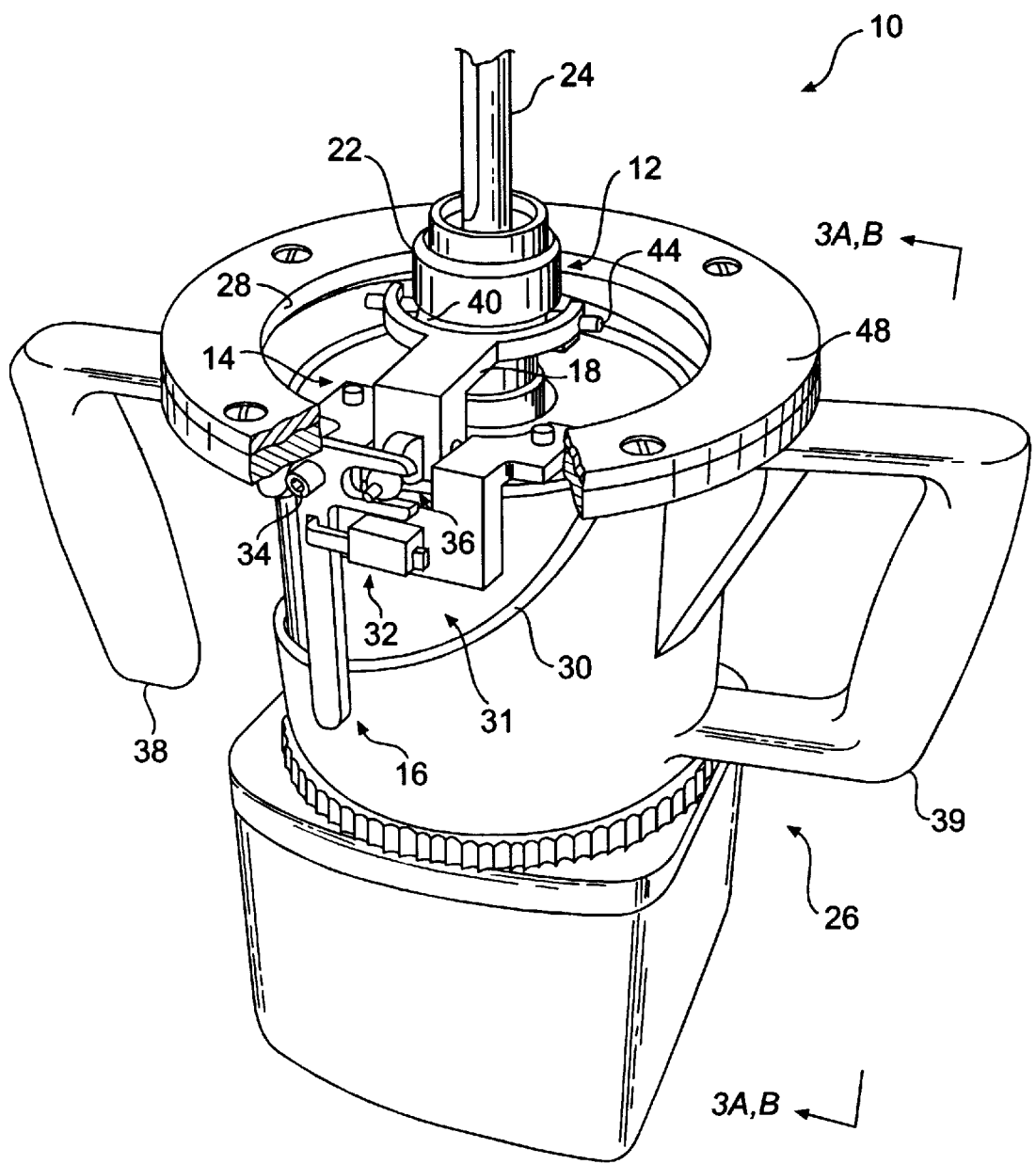
FIG. 1 is a perspective view of a router incorporating a sleeve actuating device according to the invention and a base with a helical opening.

Reference will now be made in detail to the presently preferred embodiments of the invention, one or more examples of which are illustrated in the drawings. Each example is provided by way of explanation of the invention, and is not meant as a limitation of the invention. For example, the features illustrated or described as part of one embodiment can be used on another embodiment to yield still a third embodiment. It is intended that the present invention include such modifications and variations as come within the scope and spirit of the present invention.

The present invention relates to power tools in general. For example, referring to the figures, the power tool 10 is illustrated as a conventional router. The particularly illustrated router is conventionally known as a fixed base router wherein a base member, shown generally as 26, is axially movable or positionable by rotating the base relative to a motor casing 14. This type of router is well known to those skilled in the art. The invention has distinct advantages as it pertains to a fixed base router, as will be described in greater detail below, but this is not meant as a limitation of the invention.

Rotary power tool 10 according to the invention includes a chuck device, generally 12, for holding a tool bit 24. For example, in the embodiment of the power tool illustrated in the figures, chuck 12 holds a router bit 24. It should be appreciated that the type of chuck 12 is not particularly important to the invention. The present invention applies to any manner of chuck, for example the chucks described and illustrated in the patent and applications discussed above, wherein chuck 12 is actuated through axial movement relative to body member or drive spindle of tool 10. For example, chuck 12 may be actuated by axial movement of an outer sleeve member 22 relative to the drive spindle. There are a number of sleeve actuated chuck devices known to those skilled in the art and the particular operation of chuck device 12 or the actuating mechanism is not necessary for appreciation or understanding of the present invention. Thus, chuck 12 nor remote chuck actuating device 31 will not be described in detail herein. One particular type of chuck for which the present invention is particularly applicable is illustrated and described in U.S. Pat. No. 5,810,366 and U.S. Pat. No. 5,947,484, the entire disclosures of which are incorporated herein by reference in their entirety for all purposes.

The chuck illustrated in the present figures is similar to the chuck illustrated and described in pending application Ser. No. 09/067,569. With this particular type of chuck, an axial bore is defined by a plurality of longitudinally extending gripping segments separated by axially extending slits. An axially movable sleeve member surrounds the gripping segments. The gripping segments are compressed radially inward upon axial movement of the sleeve member to a gripping position to grip upon a tool shank inserted into the bore. The tool is released when the gripping segments move to a release position upon opposite axial movement of the sleeve.

A chuck 12 useful in the present invention includes some structure or mechanism, such as sleeve 22, having a circumferential groove 40, ridge, or other structure defined therein for engagement with a first member 18. Circumferential groove 40 may be formed as an integral component of sleeve 22 or, in an alternative embodiment, an additional outer sleeve or ring member defining the circumferential groove may be fitted onto sleeve member 22. This embodiment may be particularly useful in retrofitting the present invention to existing power tools and chucks. Referring again to the figures in general, rotary power tool 10 includes a casing 14 housing a rotational drive spindle. Casing 14 is also the housing member for the drive spindle motor (not illustrated).

The invention includes a base member, generally 26, as is commonly understood in the art. The router illustrated in the figures is a fixed base router, thus the base is axially advanceable relative to casing 14 by rotating base 26 relative to the casing. Upon rotation of the base 26, working surface 48 of base 26 is axially positioned to establish a working position of tool 24 held by chuck device 12 relative to a work piece. The operation of the base member is conventional and well known to those skilled in the art. In general, an operator adjusts the base member by rotating base 26 by handle 38 causing the base member to move axially relative to casing 14.

In the embodiment wherein chuck device 12 incorporates an axially movable outer sleeve 22, the remote chuck actuating device 31 includes a first member 18 engaged with outer sleeve 22 for moving chuck device 12 between the gripping and release positions.

First member 18 is operably connected to actuator member 16 so that when an external force is applied to actuator member 16, first member 18 will cause at least one engaging arm 44 to move chuck device 12 between the gripping and released positions.

Figure 2:
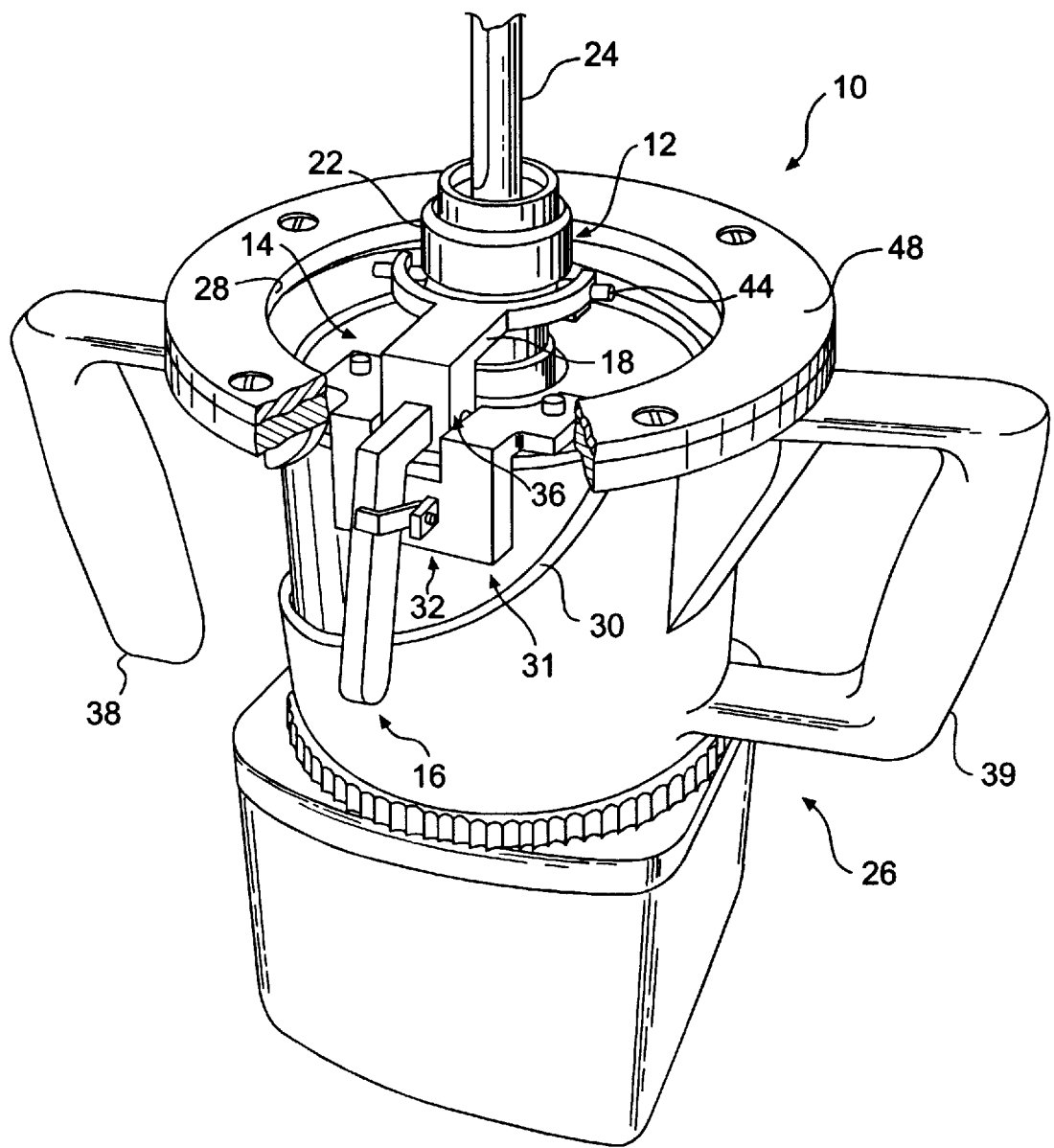
FIG. 2 is a perspective view of a router incorporating a second sleeve actuating device and base with a helical opening.

In the two embodiments depicted in FIGS. 1 and 2, actuator member 16 extends in the axial direction. In the embodiment depicted in FIG. 1, the actuator member 16 moves in a plane generally tangent to base 26. In FIG. 2, actuator member 16 is pivotably movable towards and away from longitudinal axis of tool bit 24. In both embodiments, locking device 32 holds actuator member 16 in at least one position. By activating locking device 32 remote chuck actuating device 31 may be locked into either a gripping or release position.

In FIG. 1, actuator member 16 is attached to base 14 at pivot point 34. Actuator member 16 is operably connected with first member 18 at joint 36.

In FIG. 2, actuator member 16 is attached to first member 18 at joint 36. It should be noted by one skilled in the art that the connection between actuator member 16 and first member 18 can be made in numerous ways. The joint connection shown in FIG. 1 and FIG. 2 are two such embodiments.

Remote chuck actuating device 31 is connected to base 14 and extends through a helical opening formed in base 26. As base 26 is advanced and retracted axially with respect to casing 14, remote chuck actuating device 31 will stay within opening 30 of base 26. By having remote chuck actuating device 31 inside opening 30, base 26 may be advanced and retracted while remote chuck actuating device 31 may be operated in any position of the base 26. Handles 38 and 39 are used to advance or retract the base 26. It should be noted that handle 38 is not attached to base 26 at the lower end because of the helical opening in base 26. The helical opening may extend at any pitch as long as said pitch matches the pitch of the threads or other engagement mechanism connecting casing 14 to base 26. The helical opening preferably may extend generally about 180 degrees to about 360 degrees.

Figure 3A:
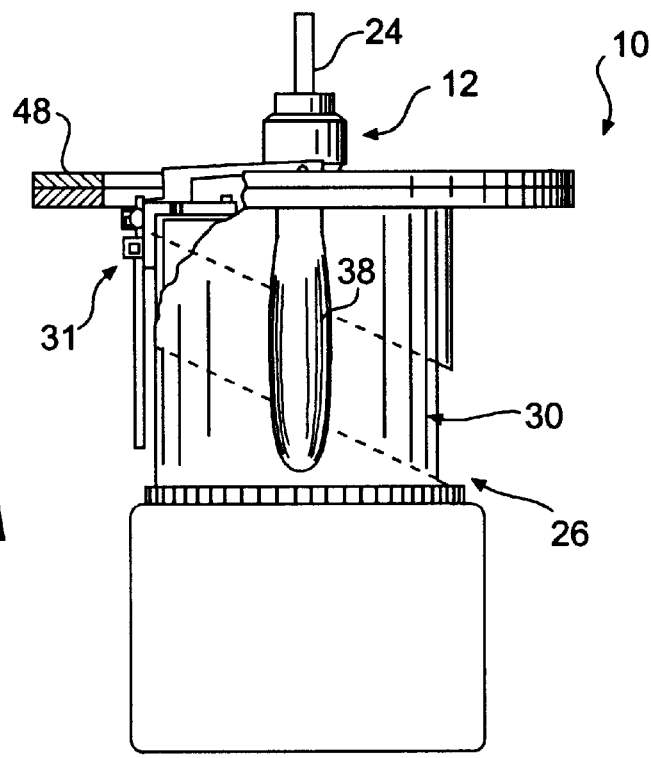
FIG. 3a is an elevational view of a fixed base router with a sleeve actuating device with a base with a helical opening with the base in a down position.

In FIG. 3a, router 10 is shown as a fixed base router with base 26 having a helical opening 30 and casing 14. Sleeve actuating device 31 is positioned at the top of the helical opening (shown in phantom as 30). In this position, base 26 causes tool bit 24 and chuck 12 to be fully exposed to a workpiece.

Figure 3B:
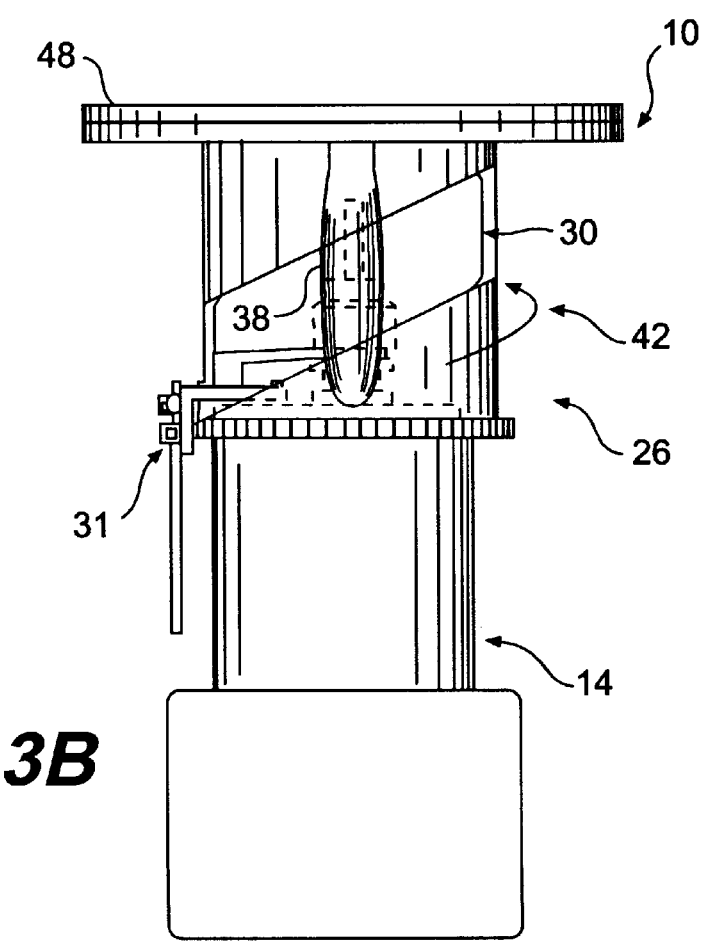
FIG. 3b is an elevational view of a fixed base router with a sleeve with a base with helical opening with the base in an up position.

Referring now to FIG. 3b, router 10 is shown with casing 14 attached to fixed base 26 whereas now fixed base 26 is fully extended with respect to casing 14. Remote chuck actuating device 31 is positioned at the bottom of helical opening 30. Arrow 42 shows the direction in which base 26 is rotated with respect to casing 14 in order to extend base 26 with respect to casing 14. It should be appreciated that the opening in base 26 can take on any shape or configuration and serve the purpose of allowing the actuating device 31 to stay in opening 30 regardless of the position of base 26 and casing 14. Any and all such constructions are within the scope and spirit of the invention.

It should be appreciated by those skilled in the art that various modifications and variations can be made in the present invention without deviating from the scope and spirit of the invention. It is intended that the present invention include such modifications and variations as come within the scope of the appended claims and their equivalents.

What is claimed is:

1. A rotary power tool having a remotely actuated chuck device, said power tool comprising:

a casing housing a rotationally driven drive spindle;

a chuck device attached to an end of the drive spindle, said chuck device movable between a gripping position wherein said chuck device clamps upon a tool held therein, and a release position wherein said chuck device releases a tool held therein;

an actuating device operably engaged with said chuck device to move said chuck device between said gripping and release positions, wherein said actuating device has a portion extending radially beyond a perimeter of said casing;

a base concentric on said casing, said base comprising an upper working surface for establishing a working position of said tool held by said chuck device relative to a workpiece, said base rotatably advanceable on said casing for adjusting said working position; and wherein said base further comprises a helical opening therearound having a width to accommodate said portion of said actuating device extending radially beyond the perimeter of said casing as said base is rotatably advanced relative to said casing.

2. The rotary power tool as in claim 1, wherein said rotary power tool is a router.

3. The rotary power tool as in claim 1, wherein said helical opening extends about 180 degrees around said base.

4. The rotary power tool as in claim 1, wherein said chuck device comprises an outer sleeve member that is axially movable between a gripping position wherein said chuck device clamps upon a tool held therein, and a release position wherein said chuck device releases a tool held therein.

5. The rotary power tool as in claim 4, wherein said actuating device has a first member engaged with said outer sleeve member and extending generally radially outward from said chuck device, said first member movable in a direction so as to move said outer sleeve member between said gripping position and said release position, said actuating device further comprising an actuator member configured with said first member to move said first member upon an external force being applied to said actuator member so that an operator can move said chuck device between said gripping and release positions at a location remote from said chuck device and drive spindle.

6. The rotary power tool as in claim 5, wherein said actuator member comprises a lever arm connected to said first member and pivotally mounted relative to said casing.

7. The rotary power tool as in claim 6, wherein said actuator member comprises a lever arm connected to said first member and extending generally axially along an outside surface of said casing.

8. The rotary power tool as in claim 7, wherein said lever arm extends axially along said casing and is pivotally mounted to said casing so as to rotate in a plane generally tangent to said casing, and further comprising a joint mechanism operationally disposed between said lever arm and said first member to convert rotational movement of said lever arm to pivotal movement of said first member.

9. The rotary power tool as in claim 1, further comprising an adjusting device configured with a locking mechanism for maintaining said remote chuck actuating device in a position to keep said chuck device in a gripped or released position.

10. A rotary power tool having a remotely actuated chuck device, said power tool comprising:

a casing housing a rotationally driven drive spindle, having at least one handle attached to said casing;

a chuck device attached to an end of the drive spindle, said chuck device comprising an outer sleeve member that is axially movable between a gripping position wherein said chuck device clamps upon a tool held therein, and a release position wherein said chuck device releases a tool held therein;

a remote chuck actuating device having a first member operably engaged with said outer sleeve member and extending generally radially outward from said chuck device, said first member movable in a direction so as to move said outer sleeve member configured between said gripping position and said release position, said remote chuck actuating device further comprising an actuator member configured with said first member to move said first member upon an external force being applied to said actuator member so that an operator can move said chuck device between said gripping and release positions at a location remote from said chuck device and drive spindle, wherein said remote chuck actuating device has a portion extending radially beyond a perimeter of said casing;

a base concentric on said casing, said base comprising an upper working surface for establishing a working position of said tool held by said chuck device relative to a workpiece, said base rotatably advanceable on said casing for adjusting said working position; and wherein said base further comprises a helical opening therearound having a width to accommodate said portion of said actuating device extending radially beyond the perimeter of said casing as said base is rotatably advanced relative to said casing.

11. The rotary power tool as in claim 10, wherein said actuating member comprises a lever arm operably connected to said first member and pivotally mounted relative to said casing.

12. The rotary power tool as in claim 11, further comprising a locking mechanism configured to lock said actuating device in a position to keep said chuck device in said gripping or released position.

13. The rotary power tool as in claim 12, wherein said rotary power tool is a router.

* * * * *